United States Patent
Hamilton, II et al.

(10) Patent No.: US 8,245,241 B2
(45) Date of Patent: Aug. 14, 2012

(54) ARRANGEMENTS FOR INTERACTIVITY BETWEEN A VIRTUAL UNIVERSE AND THE WORLD WIDE WEB

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 11/866,077

(22) Filed: Oct. 2, 2007

(65) Prior Publication Data
US 2009/0089364 A1 Apr. 2, 2009

(51) Int. Cl.
*G06F 9/44* (2006.01)
(52) U.S. Cl. .......... 719/318; 709/224; 709/246
(58) Field of Classification Search ............. 719/310, 719/318; 709/224, 246
See application file for complete search history.

(56) References Cited

U.S. PATENT DOCUMENTS

| | | | |
|---|---|---|---|
| 6,216,173 B1 * | 4/2001 | Jones et al. | 715/705 |
| 6,557,054 B2 | 4/2003 | Reisman | |
| 6,643,650 B1 * | 11/2003 | Slaughter et al. | 1/1 |
| 6,769,009 B1 | 7/2004 | Reisman | |
| 6,789,077 B1 * | 9/2004 | Slaughter et al. | 1/1 |
| 6,862,594 B1 * | 3/2005 | Saulpaugh et al. | 1/1 |
| 6,950,990 B2 * | 9/2005 | Rajarajan et al. | 715/736 |
| 7,000,242 B1 | 2/2006 | Haber | |
| 7,039,699 B1 | 5/2006 | Narin et al. | |
| 7,096,466 B2 | 8/2006 | Sokolov et al. | |
| 7,164,685 B2 | 1/2007 | Atamaniouk | |
| 7,207,006 B1 | 4/2007 | Feig et al. | |
| 7,548,946 B1 * | 6/2009 | Saulpaugh et al. | 709/203 |
| 2002/0040400 A1 | 4/2002 | Masters | |
| 2003/0126136 A1 * | 7/2003 | Omoigui | 707/10 |
| 2006/0095333 A1 * | 5/2006 | Gambhir | 705/25 |
| 2006/0095346 A1 * | 5/2006 | Gambhir | 705/28 |
| 2006/0165040 A1 * | 7/2006 | Rathod et al. | 370/335 |

* cited by examiner

*Primary Examiner* — Van Nguyen
(74) *Attorney, Agent, or Firm* — Jason H. Sosa; Mark C. Vallone; Schubert Osterrieder & Nickelson PLLC

(57) ABSTRACT

In one embodiment, a method for interaction between a web browser and virtual environment applications is disclosed. The method can include creating an attribute file or a cookie file in a virtual universe application and in browser applications, then sharing such files between these applications to enhance a user experience. Both the browser applications and the virtual universe applications can search for the attribute files in numerous locations including local memory, web based memory and even a third party service provider via the Internet.

11 Claims, 3 Drawing Sheets

ARRANGEMENTS FOR INTERACTIVITY BETWEEN A VIRTUAL UNIVERSE AND THE WORLD WIDE WEB

FIELD

The present disclosure relates generally to virtual universe and Web browsers and more particularly to arrangements for providing interactivity between virtual universe content and web site based content.

BACKGROUND

Operating in a virtual environment utilizing a computer is a past-time that is gaining popularity with many. A virtual environment is an interactive simulated environment that can be accessed by multiple users, where users can interact through an "online" interface via a communications network. A virtual environment can provide interactivity as there is two way communication between a user on a client application and a server that is providing changes to the virtual environment based on the user input. Thus, there can be a reciprocal information exchange where a participant can make choices within a virtual environment and the virtual environment can change content based on the participant choices. Users can inhabit and interact in the virtual environment via avatars, which can be two or three-dimensional graphical representations of human type icons often referred to as "humanoids." Alternately described, an avatar can be a graphical representation that a user can select to represent himself/herself that others can see, in the virtual world. An avatar can take the form of a cartoon-like human.

Virtual environments have many different names. For example, a virtual environment can be referred to as a "metaverse," a "3D Internet" a "virtual world," and so on. As utilized herein, a virtual universe (VU) is intended to encompass all of these environments. Although there are many different types of VUs, there are several features many VUs have in common. For example, many VUs have shared space which is a "universe" that allows many users to concurrently participate in an activity. The VU residents or avatars can traverse, inhabit, and interact with other avatars via 3-D graphics and landscapes. Thus, a VU can be populated by many thousands of residents or avatars. Often, the VU resembles the real world in terms of physics or physical laws, houses, landscapes, etc.

Many virtual environments also have a graphical user interface (GUI). The GUI can depict the environment or some form of "space" visually, ranging in style from 2D "cartoon" imagery to a more immersive 3D environment. The GUI can accept user input. In addition, many virtual environments can provide immediacy, interactivity, and persistence Immediacy allows interactions between a user's avatar and the environment to take place in real time. Interactivity with the environment allows users to alter, develop, build, or submit customized content. Persistence provides a continuous environment regardless of whether individual users are logged in. Some virtual environments also have agent's regions assets, textures, effects and socialization or a community.

SUMMARY OF THE INVENTION

The problems identified above are in large part addressed by the systems, arrangements, methods and media disclosed herein to enable a client-side application that can store metadata such as "cookies" to inter-operate between at least two distinct on-line mediums, web sites provided by the World Wide Web and virtual universes (VUs) provided by VU providers/servers. Such interoperability can enhance a user's experience as they move between mediums.

In some embodiments, a method is disclosed where both a browser and a VU client can create and exchange attribute data, including cookie files. The VU client can create an attribute file in response to activities of the user or the interaction between the user and the VU server. The attribute file can be stored as the VU application is executed. A browser can access the attribute file created by the VU application and using the attribute file, the browser or a web based server that supplies the browser can tailor or modify content provided to the user.

In other embodiments a method is disclosed where a first client application can provide a user with a first type of interactive service from the first client application via a network. The application can create an attribute file in response to activities of the user and store the attribute file. A second client application can be executed where the user receives a second type of interactive service from the second client application via the network, where the first type of interactive service is different than the second type of interactive service. The second client application can access the attribute file and use the attribute file to modify the content provided by the second interactive service.

In some embodiments, the browser can create or modify the attribute file based on a user interaction with websites and the VU client can search for, retrieve and use the browser created attribute file to modify VU content. Searching for the attribute file can be accomplished in many ways. For example searching can be commenced at a predetermined location in memory, searching can be for a system registry to detect a type of browser, searching can be for a predetermined file name, searching can include querying a remote server, or searching a local drive. In some embodiments the attribute file can be associated with other data such as a unique universal identifier (UUID), an avatar, a region or an object in the VU. The attribute file can be stored on a remote server where the browser and the VU client transmit to, and receive the attribute data from the remote web based server.

In another embodiment, a system is disclosed that can include a VU client to provide an interactive VU, and a search and retrieval engine to retrieve attribute files, where the VU client can utilize the attribute file to customize features provided to the user via the VU client. A remote "third party server" could be utilized to store the attribute file where a browser and a VU client can transmit attribute data to the remote server and can request attribute information from the remote server. In addition, a VU server can utilize the attribute files to customize content provided to the VU client. The system can also include a linking module to link attributes to one of avatars, places, objects or actions related to the user.

In yet another embodiment, a machine-accessible medium is disclosed that contains instructions to operate a processing system which, when the instructions are executed by a machine, cause said machine to execute an application where a user can accesses content via a network such as the World Wide Web (Web). The machine can create an attribute file in response to activities of the user, and it can store the attribute file and can execute a VU application. The attribute file can be accessed by the VU application, and the VU application can customize the content provided to the user. The machine-accessible medium when executed can also cause a VU application to create or modify the attribute file based on a user interaction with the VU client. The machine can also search many locations locally and remotely for the attribute file. For example, the machine can look in predetermined memory locations, it can search a system registry to detect a browser, it can search for a predetermined file name, it can query a remote server, or it can search a local storage media such as a local hard drive.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In some embodiments disclosed herein, different types of applications (browsers, virtual universe (VU) clients, VU servers, commerce servers, etc.), can store attribute files, such as metadata or "cookies," and these attribute files can be shared by these applications that provide distinct services and features. Accordingly, attribute files such as cookie files can be shared between multiple distinct on-line mediums, such as web site servers that sell goods and virtual universes (VUs) provided by VU providers/servers. Such interoperability can enhance a user's experience as they move between mediums.

In some embodiments, a browser can access the attribute file created by the VU application and using the attribute file, the browser, or a web based server that supplies the browser, can tailor or modify content provided to the user. In other embodiments, a browser can create or modify the attribute file based on a user interaction with websites and the VU client can search for, retrieve, and use the browser-created attribute file to modify VU content. Storing attribute files and searching for the attribute file can be accomplished in many ways as described below.

Figure 1:
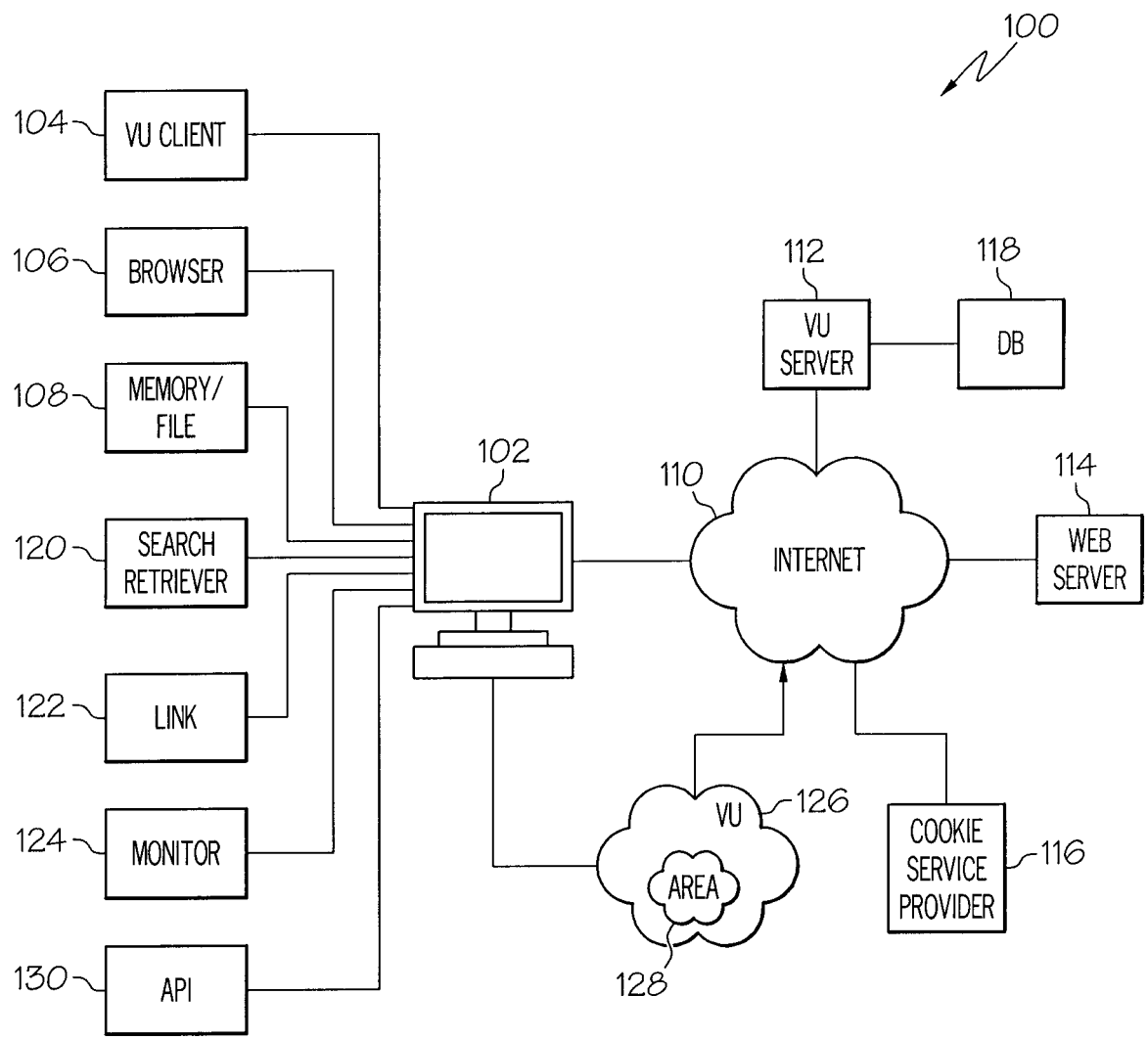
FIG. 1 depicts a high-level block diagram of a network environment.

FIG. 1 is a block diagram depicting a networking environment 100 that can provide a way to share cookie files or attribute information between client applications and web based servers that provide different types of interactive services to a user. For example, provide attribute sharing between interactive services such as a World Wide Web (Web) based server 114 for purchasing items, a browser 106, a VU client or a VU application 104, and a VU server 112. The system can include the Web that can interconnect VU server 112 (that can have a database 118), a web server 114, a cookie service provider 116, and a client computer 102. Client computer 102 can include many different modules that provide different types of interactive services such as VU client 104, Web browser 106, a memory 108 that can store files such as attribute files or cookie files, a search and retrieval module 120, a linking module 122, and a monitoring module 124.

The VU client 104 can operate on computer 102 to provide a VU region 126 that has areas 128. The user activity monitor 124 that can detect an event of the user in both the VU mode and the browser mode and can create a cookie file, herein called an attribute file, and monitor 124 can place the detected attributes in memory 108. In some embodiments the attributes can be sent to a remote server such as the cookie service provider 116. In this embodiment, the VU client 104, the browser 106, the VU server 112, and the web server can all access service provider 116 as the cookie service provider can act as a clearing house for cookie data. Service provider 116 could provide security measures for such a service.

In accordance with some embodiments, a VU client 104 can create cookies or attributes that can be utilized by the VU server 112, the web server 114, the browser 106, or the VU client 104 to modify content provided to the user via the computer 102. Such inter-operation can provide an enhanced experience for users who move back and forth between a VU mode and a web site/browser mode using computer 102. The VU client 104 could associate parts of the attribute file in memory 108, to other VU attributes such as avatar items, objects or an avatar's universal unique identifier (UUID).

Accordingly, avatar and VU attributes created by the VU client 104 could be harvested from memory 108 by a browser 106, and the browser 106 could utilize the attributes to modify the content provided to the browser 106. Accordingly, web server 114 could utilize an avatar or user attributes to modify the content provided by the web server 114. The disclosed arrangements can provide an automatic and transparent file exchange between a client application, such as browser 106, VU client 104, and a VU server 112, where the user could approve of such a sharing via user settings and all file sharing processes could run in the background where no user interaction is required to facilitate the process.

Thus, data or information about user activities and preferences can be exchanged between web servers 114, VU servers 112, VU clients 104, and browsers 106 using various methods. Thus, attribute file data can be acquired, imported, exported, and updated by various applications and such data can be stored at various locations. In some embodiments, VU server 112 can modify VU content provided to the VU client 104 and several services at several locations can support cookie file or attribute file sharing. In some embodiments, cookies or attribute files can be utilized by the VU client 104 to map web site hosts administrated by web server 114 to VU regions 126 and VU areas 128 managed by VU server 112 such that specific buildings, regions or areas 128 in the VU 126 can be assigned to a specific cookie file.

Similar to the "real-world", a VU can have virtual buildings, regions or areas with boundaries as defined by the VU. Each virtual region 126 within the VU 112 can include items such as living landscapes having things, or objects, or interactive objects such as buildings, stores, clubs, sporting arenas, parks, beaches, signs, billboards, movie theaters, television screens, computers, cities and towns all created by residents of the universe where residents are represented by avatars. All of these items can be assigned an attribute or cookie file. A user's avatar can move about the objects in VU much like humans move about their neighborhoods, towns and world. The single virtual region 126 shown is for illustration purposes and there may be many more regions as found in typical VUs. Users operating computers 102 may interact with the VU 126 through a communication network via a VU client 104 that can reside in the computer 102.

The VU client 104 and computer 102 can have an activity monitor 124 that can detect an event of the user or an avatar induced action, and based on the event, the activity monitor 124 can determine preferences of the user or the avatar and the monitor 124 can create a cookie file or an attribute file and store it in many places. For example, the attribute file could be stored locally in memory 108, at cookie service provider 116, in VU server 112, in web server 114, or as part of browser 106. Different servers (112, 114) and clients (104, 106) could access such data.

When the user transitions into, or out of a mode such as into or out of the VU using VU client 104, the VU client 104 may search for the attribute file such that it can be utilized to modify VU content that is provided by the VU server 112. In addition, the VU client 104 could provide the attribute file to the VU server 112 such that the VU server 112 could modify content sent to the VU client. Likewise, when the user transitions into or out of a web browsing mode via the browser 106, the browser 106 can search for one or more attribute files in one or more locations created by the VU system and utilize the data in such files to modify content provided to the user. In some embodiments, a trigger can be generated by an action of a user. For example, the trigger could be generated by the browser 106 or VU client 104, and the trigger could be sent to the search and retrieve module 120 and link module 122 where a search for the attribute data could begin. The search could include a search with multiple successive stages where each stage has a different method. Further, the search and retrieve module 120 can search in multiple locations such as local locations and remote locations via the Web.

In some embodiments, the VU client 104 can be mapped to VU websites or VU servers 112 that host VU regions or areas 128. In some embodiments, VU generated attribute files or VU cookie files created by monitor 124 could be stored in memory locations 108 that are utilized or readily accessible by browser 106 such that browser 106 can readily access "VU cookies" during Web interactions or web browsing.

In other embodiments, a VU client 104 via the search and retrieve module 120 can originate and execute a scan of memory 108 for attribute data previously stored by the web browser 106 or the web server 114. When located, the attribute data can be extracted from the memory 108. In other embodiments, indexes or links can be created by link module 122 to easily locate the attribute. In other embodiments, the data can be copied from various data storage locations such as memory 108 and placed in high performance memory proximate to a processor (not shown). Accordingly, when the search and retrieve module 120 finds the stored attribute data, the data can be retrieved and imported into the memory that directly supports the VU client 104.

The sharing of attribute data can be invoked through the use of triggers. Many different triggers or types of triggers could invoke the exchange of attribute information between VU client 104, browser 106, web server 114, and VU server 112 as in some embodiments, these modules/algorithms could transmit such data to each other. User events, such as a modification to the attribute file, a user request for a change of displayed content, a user request for website content, a manual request for customized content and a change of mode between a browser mode and VU mode, or a newly selected link from a web site could produce such a trigger to the search and retrieve module 120. In another embodiment, when the VU client 104 is plugged in, or some form or initialization takes place, the VU client 104 or the browser 106 could trigger a request for attribute data. In other embodiments, the data search/retrieval/upload/update can occur at specified time intervals based on a timer or real time, possibly during VU client 104 operations. The search and acquisition for attribute data may have a low priority and could be invoked as a low priority background thread.

In some embodiments, the search and acquisition process by search and retrieval module 120 can search the local computer's memory 108 to determine a brand of browser. This successful identification may lead to additional information such as the web browser's location in memory 108 and to a location in memory 108 where cookie/attribute files are located by the specific browser. Thus, search and retrieval module 120 can provide a multi-tier search that has a hierarchy, where when no beneficial information has been located in a search the search criteria can be changed and the process can iterate to a different type of search until attribute data is located. Several scanning methods for several locations can be conducted. For example, a local disk sweep type search can scan all local disks and memory to look for the presence of a web browser, and a remote search via the Web could also be conducted.

Detection of the web browser 106 may occur by storing file names of known web browsers and then during the scan or search comparing file names of known web browsers to files located during the disk scan. Upon detection of a known browser, the browser's location in memory and location of its attribute file or cookie store can be acquired for future use by the VU client 104. The browser 106 could also conduct this process to find attribute data stored by the VU client 104. Thus, after the memory address of the attribute data is determined, it can be shared between the browser 106, the VU client 104, the web server 114 and the VU server 112. In some embodiments, other authorized applications could access the attribute data.

In some embodiments, the attribute data can be located utilizing a common "location sweep." A common location sweep can check known default locations in memory 108 that a web browser 106 may utilize or will typically utilize to store the attribute data. Link module 122 may store or provide common links to preferred memory locations where browsers to store attribute data such as cookie data. If a particular browser utilizes a known location, the link module 122 can provide data on where the cookies or attribute data is typically stored. This relationship could also be preloaded into the VU client 104 so that the VU client 104 knows where to locate data created by the browser 106 or the web server 114. Accordingly, heuristics of attribute storage locations of specific browsers can be utilized by the VU client 104 to locate such data.

It can be appreciated that common memory locations or links to attribute data that are utilized by specific browser may be based on predetermined guidelines or code provided by the creator of the browser. A common location sweep can be a faster method to locate attribute data than the local disk sweep, but a common location sweep may not be able to locate the desired data. For example, the common location sweep may miss some nonstandard browsers or browser installations. In some embodiments, a common location sweep can be conducted and if the common sweep is not successful, then a local disk sweep can be conducted, then a search for a remote location can be conducted etc. where a search hierarchy occurs by the search and retrieval module 120.

In yet another embodiment, a registration scan or sweep can be conducted by the search and retrieval module 120. In such a process, the search and retrieval module 120 can scan an operating system registry to determine what web browsers loads and operates on computer 102. A list of known registry keys can be stored by the VU client 104 and during the scan, browsers registry keys can be detected and compared to the list of known web browsers registries. Upon detection of a known browser, the location of its cookie store or attribute data can be extracted from the registry. Link module 122 can have this information stored in memory 108 for future use by various applications.

In some embodiments, an extraction process can be executed by the search and retrieval module 120. In some embodiments, cookies can be extracted from a web browser cookie store after the cookie file is located by the scanning process. In some embodiments, the file extraction process can extract the attribute data from memory 108 via a text file read operation. Each browser 106 may implement differing cookie storage methods, and therefore, different methods can be utilized to locate and extract the data based on the identified browser. It can be appreciated that browsers such as Microsoft Internet Explorer stores each cookie as a separate file, whereas Mozilla, Firefox, and Netscape browsers can store cookies in a single file. Microsoft Internet Explorer, Mozilla, Firefox, and Netscape are all trademarks belonging to their respective owners.

In other embodiments, an application programming interface (API) 130 can perform the extraction of attribute data from a browser application 106 and possibly from a web server 114 or a third party cookie service 116. When an API extraction method is utilized, attributes such as cookies can be extracted from browsers that have an API 130. Browsers that have an API will typically allow external applications access to the browser's attribute files. In some embodiments, the API 130 may support iteration retrieval methods or bulk retrieval methods such as the ones discussed above.

Upon extraction of attribute files from the determined location, the cookies can be imported into the VU client 104 and stored. In some embodiments, the VU client can store a copy of the attribute files every time the VU client 104 is invoked. Some embodiments may import cookies through a VU client API 130 that supports bulk import methods. Upon importation, embodiments may differ on use, storage, and visualization of data files. If cookies are to be stored as a result of a user/VU interaction, the VU client 104 may export the cookies to the local web browser 106. Some embodiments may export cookies with direct manipulation of web browser cookie stores, through an API insertion method, or using the third party cookie service 116.

Third party cookie service 116 could query all possible storage locations such as the VU client 104, and the browser 106 and store cookies remotely. In some embodiments, the browser 106 and the VU client 104 could transmit the attribute data to the third party service 116 via the Web at different intervals possibly when the user's computer 102 transitions into, or out of the VU application 104, or into or out of a browser application 106. Attribute information for both browser's 106 and VU's applications or clients 104 may be stored and accessed by the cookie service provider 116. Browser 106 could transmit attribute information to the trusted service provider 116 for storage and subsequent retrieval by all authorized applications.

Transmission and retrieval may or may not be secure or encrypted, depending on user settings and protocol implementation. Sharing of attribute information could also be accomplished through a browser extension or plug-in. The browser 106 may or may not maintain a local attribute file or cookie store. In some embodiments, the user could control or provide a setting where the attribute storage process could be accomplished with different browser security settings, privacy settings and an authentication. A user could also select to utilize the attribute clearing house or "cookie service" 116 such that the computer 102 can operate after it is configured in a user-agnostic manner.

The VU client 104 could utilize different protocols such as a hypertext (HTTP), Representational State Transfer (REST), create, retrieve, update, and delete (CRUD) or Simple Object Access Protocol, (SOAP) or Service Oriented Architecture Protocol (SOAP) format. Additionally, embodiments may create a new protocol for VU client cookie transmission. Memory 108 can take many forms, such as random access memory, read only memory, or a hard disk. Attribute data such as cookie data and metadata, may be stored in memory 108. As can be appreciated, known technology can be utilized to access, index, update, and delete such data from the local storage media.

A typical VU server 112 can have data bases such as data base 118 that stores a user's virtual assets or "inventory" such as an avatar. In some embodiments, the attribute data can be stored as inventory items for an avatar in the VU grid's asset database 118. Embodiments may vary in graphical presentation of the cookies stored in the inventory data base 118. For example, some files in the database may show each unique cookie within the inventory. Other files or arrangements may show single inventory items that represents all cookies. Storing items within the inventory database may have the additional benefit of allowing access to cookies from multiple computers (not shown).

In one embodiment, a cookie file or an attribute file specific to preferences can be associated with elements in the VU such as an avatar, a region, or a building. If a file has been previously acquired on a region or building, or a web-based cookie is associated with a region or building, the attribute files may be utilized by the VU client 104 based on the avatar being in a particular region or building such as area 128. Thus, attribute files could be utilized exclusively in a VU region similar to a VU region being a unique web site. Embodiments may opt to graphically depict the transmission of a cookie to the VU region or building, or they may silently transfer the cookie.

The details of transferring a cookie to a region or building can depend upon the implementation, but the exchange and management of files could utilize standard VU type communications. The attribute data transfer may occur upon entrance to a region or building, or upon the request of a VU server. Such an exchange can prove useful because a user in a VU may enter a virtual department store to purchase items and the VU client 104 could utilize the attribute data to provide custom content to the user. The cookie transfer may occur upon being located in the same region with the associated avatar or upon request by the avatar. In addition, cookies from avatars and regions or buildings within a VU can be transferred to other applications.

Upon entrance to an area 128, a region or a building within a VU 126, the area 128 may present the avatar with a cookie. Depending upon the embodiment and the user's privacy and security settings, the cookie may either be accepted or rejected. If accepted, the cookie or other attributes could be stored. Upon interaction with an avatar, the avatar may present the VU client 104 with a cookie. In some embodiments the cookie service provider could provide a cookie mapping service. The cookie mapping service could be a "bidirectional" mapping service of Internet hosts and VU regions or buildings. Web browser cookies can have metadata associated with each cookie defining which "host names" the browser 106 should transmit the cookie to as part of every HTTP request.

Client computer 102 can provide a web hostname or a VU avatar, region, or building ID as a request to the mapping service 116. Multiple avatars regions or buildings may be mapped to the same hostname. The response to the request can be either an avatar, region, or building identifier that uniquely identifies the VU avatar, region, or building associated with the hostname. If such an identifier is provided in the request, the appropriate hostname can be returned. Some embodiments could return a special response when the requested mapping does not exist. Mapping may be inserted into the service through several methods. For example, owners of websites and VU regions may submit mapping information. A registration fee may be collected by the service providers. In some embodiments, users may tag regions of land or web sites supplying the required information for mapping.

Creating interoperability between web site cookie files and with VU regions and avatars may be useful in a multitude of situations. In some embodiments, a user can declare preferences identified with a web site cookie and such preferences could carry over to a related area 128 such as a region or building within a VU 126. For example, if a user declares they want a certain "theme" for a web site, the corresponding VU theme could be automatically applied when the user's avatar enters the associated area 128, region or building (or vice versa). In some embodiments, a cross media shopping support mode could be provided. A user may begin to purchase an item on a web site, decide they would prefer a 3-D view of the item, and move into a VU 126 where the attribute data could be utilized to customize content.

When a user via an avatar enters an area 128 associated with the web site, the item they were shopping for could be in their virtual shopping cart, and they could view it in three dimensions and complete their purchase from within the VU 126 (or vice versa). When the user returned to the website supplied by the web server 114, the item they purchased from within the VU 112 may be removed from their web shopping cart. An online store may also use this method even if the user did not intend to enter the VU 126 for the purpose of completing the purchase. The 3-D experience may serve as a more persuasive venue to sell something where a user has previously expressed interest in the item.

Tracking of residents as they move from web sites to related VU regions or buildings appears to be a useful statistic to be gathered, and such data could be used to optimize advertising campaigns and user profiling. This attribute data could be stored by the VU server database 118. Such tracking may also be used by parents to monitor the activities of children. The cookie objects described herein may be used to maintain preferences and states among different VUs that participate in the services described and among different virtual areas 126 that participate. The multiple-use/shared attribute data can provide a versatile system for authenticating, tracking, and maintaining specific information about residents, such as preferences and the contents of their electronic shopping carts.

The attribute files can be further used by web servers 114 or VU servers 112 to differentiate residents and to operate in a way that depends on a particular resident's attributes. Sharable attribute data could be utilized in a virtual shopping basket so that residents can more easily navigate between different VUs, different places of business, different buildings, and the client computer 102, adding or removing items from the Web or a "multiple-VU" shopping basket at any time. Sharable attribute files can also allow residents to log in to a website, VU region, multiple VUs, or gain admission to buildings in a VU. Users may log in by inserting their credentials into a login page for the VU, building, web site, or a VU region. Sharable attribute files can allow the servers (112, 114) to know that the user is already authenticated, and therefore is allowed to access services or authorized to perform operations that are restricted to authorized users. Sharable attribute files can be utilized to characterize preferred movements, gestures, and flight paths characteristics of an avatar.

As stated above, a sharable attribute file could be utilized to allow or prevent accessibility to various features. In some embodiments, an individual that has hand tremors may have a cookie variable that can be utilized to help control a mouse on a web page (e.g. activate software to filter out tremor motions) or help with movements within several different VUs. Sharable attribute files can allow for personalization of the content that is provided based on a resident's preferences (such as the use of graphical skins in a VU or at a web site.) and these preferences may be used across multiple VUs. For example, a user may prefer bright colors, large fonts, and high contrast in both web graphical user interfaces (GUI)s and VU GUIs. In some embodiments, the sharable attribute files can allow VU residents to specify how many search results per page they want to see in different VUs and in a web search so that the results are presented in familiar fashion.

As stated above, VU client software can present avatars and regions or buildings with cookies received from an associated web site, along with modification of these cookies for use by a web browser. Such a mapping and service offers new levels of interoperability between web sites and VUs. Examples of well known computing systems, environments, and/or configurations that may be suitable for use with an exemplary computer include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage devices.

Figure 2:
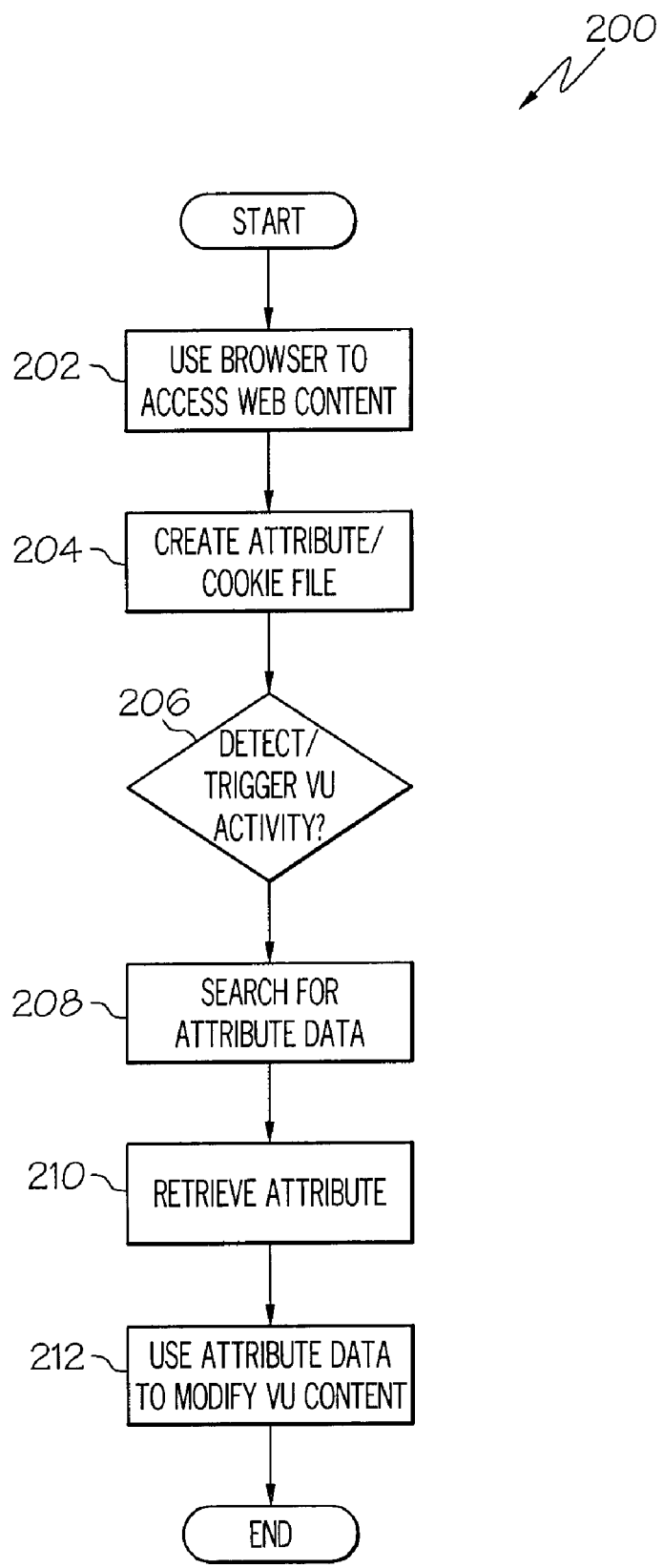
FIG. 2 is a flow diagram providing a method for managing attribute files or "cookie" files.

Referring to FIG. 2 a flow diagram of a method for sharing attribute files is illustrated. As illustrated by block 202 a user can utilize a browser to access web content. The content can be provided by a web server via the Internet. As illustrated by block 204, the browser can create and store the attribute/cookie file where the file contains data regarding on a user's activity or possibly user preferences. As illustrated by decision block 206, it can be determined if a trigger has occurred due to a VU interaction. If no triggers have occurred then the process can revert to block 204 where cookies can continue to be created and modified.

If a trigger occurs, then the VU client can search for attribute data as illustrated by block 208. As explained above, a multi-tier search can be conducted. As illustrated by block 210 attribute data such as cookie data can be retrieved and as illustrated by block 212 the attribute data can be utilized to modify VU content sent to the user. The process can end thereafter.

Figure 3:
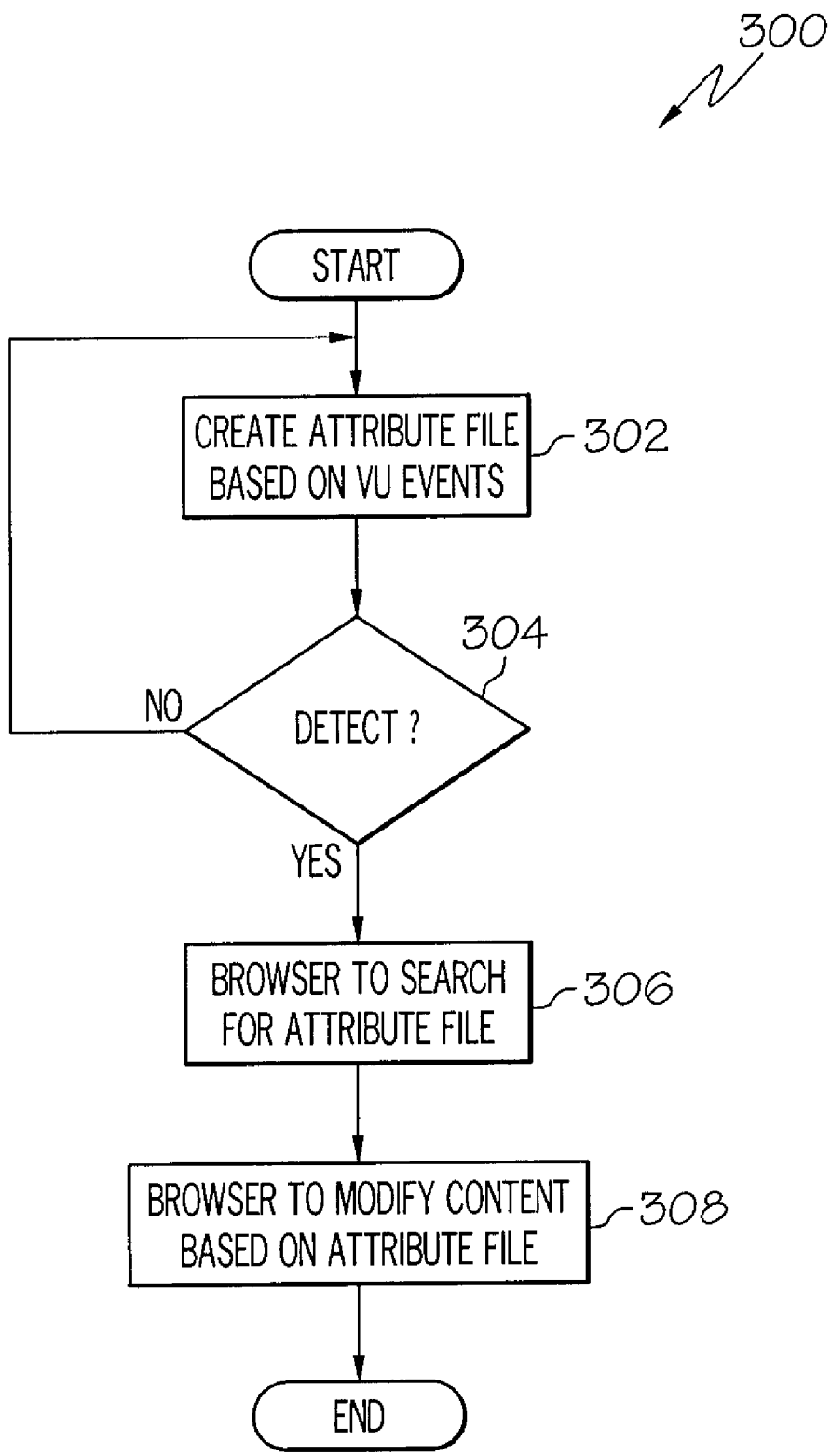
FIG. 3 is a flow diagram providing another method for managing attribute files.

Referring to FIG. 3 a method for creating and utilizing an attribute file from a VU system is illustrated. As illustrated by block 302, an attribute file, such as a file that can store cookies can be created based on an activity or event detected by a VU system. As illustrated by decision block 304, it can be determined if a trigger has been detected. A trigger can come from a simple timer or a link that is selected or a user has requested a mode change. For example, a mode change request could occur when a user decides to move from a VU to a browser mode.

If no trigger is detected, the attribute files can continue to be created and modified in accordance with block 302. If a trigger is detected, then a browser can search for an attribute file as illustrated in block 306. As illustrated by block 308, a browser can modify content provided to a user based on the attribute file. Generally, a browser can tailor content provided to a user based on user preferences that can be found in, or inferred from the attribute file. The process can end thereafter.

An implementation of the process described above, may be stored on, or transmitted across some form of computer readable media. Computer readable media comprises "computer storage media." "Computer storage media" includes volatile and non-volatile, removable and non-removable media, implemented in any method or technology for storage of information such as computer readable instructions, data structures, program modules, or other data. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other device which can be used to store the desired information and which can be accessed by a computer.

Reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of data storage media. Illustrative data storage media include, but are not limited to: (i) non-writable storage media (e.g., read-only memory devices within a computer such as CD-ROM disks readable by a CD-ROM drive); and (ii) writable storage media (e.g., floppy disks within a diskette drive or hard-disk drive); Such data storage media, when storing computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable data storage medium providing program code for use by or in connection with a computer or any instruction execution system. For the purposes of this description, a computer-usable or computer readable data storage medium can be any apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this document that the present disclosure contemplates methods, systems, and media that provide different modes related to a VU. It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising the steps of:
   a server computer hosting a graphical virtual environment for display on a client computer;
   subsequent to the client computer connecting to the server computer, the server computer monitoring actions of an avatar controlled by the client computer;
   the server computer determining that the avatar has come into contact with an area or object of the graphical virtual environment that is associated with a specified website, and in response, the server computer requesting access to a cookie stored on the client computer by a computer hosting the specified website;
   the server computer accessing one or more cookies from the client computer, wherein the one or more cookies were previously stored on the client computer by a computer hosting a website, and wherein one of the one or more cookies is the cookie stored on the client computer by the computer hosting the specified website; and
   the server computer modifying content within the graphical virtual environment based on data in the one or more cookies.

2. The method of claim 1, further comprising the step of the server computer associating each of the one or more cookies with one of a universal unique identifier, an avatar representing a user of the client computer, a region within the graphical virtual environment, and an object within the graphical virtual environment.

3. The method of claim 1, further comprising the steps of the server computer identifying a subsequent connection between the client computer and the server computer and, in response, the server computer searching for the one or more cookies on a remote computer, wherein the remote computer maps cookies received from the client computer to objects within the graphical virtual environment.

4. The method of claim 1, wherein the step of the server computer modifying the content within the graphical virtual environment based on the data in the one or more cookies comprises the steps of:
the server computer determining preferences of a user of the client computer based on the one or more cookies; and
the server computer customizing regions of the graphical virtual environment displayed on the client computer to match the preferences of the user.

5. The method of claim 1, further comprising the step of: in response to an action taken by a user of the client computer in the graphical virtual environment, the server computer storing a cookie on the client computer, wherein the cookie stored by the server computer is accessible to the computer hosting the website when the client computer is connected to the computer hosting the website.

6. A computer system comprising:
one or more processors, one or more computer-readable tangible storage devices and program instructions which are stored on at least one of the one or more storage devices for execution by at least one of the one or more processors, the program instructions comprising:
program instructions to host on the computer system a graphical virtual environment for display on a client computer;
program instructions to, subsequent to the client computer connecting to the computer system, monitor actions of an avatar controlled by the client computer;
program instructions to determine that the avatar has come into contact with an area or object of the graphical virtual environment that is associated with a specified website, and in response, request access to a cookie stored on the client computer by a computer hosting the specified website;
program instructions to access at least one cookie from the client computer, wherein the at least one cookie was stored on the client computer by a computer hosting a website, and wherein one of the at least one cookie is the cookie stored on the client computer by the computer hosting the specified website; and
program instructions to customize one or more features of the graphical virtual environment for display on the client computer based on data in the at least one cookie.

7. The computer system of claim 6, further comprising program instructions, stored on at least one of the one or more storage devices for execution by at least one of the one or more processors, to associate the at least one cookie with one of a universal unique identifier, an avatar representing a user of the client computer, a region within the graphical virtual environment, and an object within the graphical virtual environment.

8. The computer system of claim 6, further comprising program instructions, stored on at least one of the one or more storage devices for execution by at least one of the one or more processors, to, in response to an action taken by a user of the client computer in the graphical virtual environment, store a cookie on the client computer, wherein the stored cookie is accessible to the computer hosting the website when the client computer is connected to the computer hosting the website.

9. A computer program product comprising:
one or more computer-readable tangible storage devices and program instructions stored on at least one of the one or more storage devices, the program instructions comprising:
program instructions to host a graphical virtual environment for display on a client computer;
program instructions to, subsequent to connecting to the client computer, monitor actions of an avatar controlled by the client computer;
program instructions to determine that the avatar has come into contact with an area or object of the graphical virtual environment that is associated with a specified website, and in response, request access to a cookie stored on the client computer by a computer hosting the specified website;
program instructions to access one or more cookies from the client computer, wherein the one or more cookies were previously stored on the client computer by a computer hosting a website, and wherein one of the one or more cookies is the cookie stored on the client computer by the computer hosting the specified website; and
program instructions to customize content within the graphical virtual environment for the client computer based on data in the one or more cookies.

10. The computer program product of claim 9, further comprising program instructions, stored on at least one of the one or more storage devices, to associate each of the one or more cookies with one of a universal unique identifier, an avatar representing a user of the client computer, a region within the graphical virtual environment, and an object within the graphical virtual environment.

11. The computer program product of claim 9, further comprising program instructions, stored on at least one of the one or more storage devices, to, in response to an action taken by a user of the client computer in the graphical virtual environment, store a cookie on the client computer, wherein the stored cookie is accessible to the computer hosting the website when the client computer is connected to the computer hosting the website.

* * * * *